(12) United States Patent
Hee

(10) Patent No.: US 7,497,793 B2
(45) Date of Patent: Mar. 3, 2009

(54) BICYCLE DERAILLEUR

(76) Inventor: Min Young Hee, 509-1002 Eunhamaul Jung 4 dong Wonmigu, Buchunschi, Kyunggi-do (KR)

(*) Notice: Subject to any disclaimer, the term of this patent is extended or adjusted under 35 U.S.C. 154(b) by 874 days.

(21) Appl. No.: 11/093,758

(22) Filed: Mar. 30, 2005

(65) Prior Publication Data

US 2006/0122016 A1    Jun. 8, 2006

(30) Foreign Application Priority Data

Dec. 8, 2004    (KR) .................. 10-2004-0102741

(51) Int. Cl.
*F16H 9/00*    (2006.01)
(52) U.S. Cl. .................. 474/80; 280/236; 474/87
(58) Field of Classification Search .................. 474/69, 474/80, 84, 87; 280/237, 236; 74/594.1, 74/594.4

See application file for complete search history.

(56) References Cited

U.S. PATENT DOCUMENTS 5,254,042 A * 10/1993 Chung-Suk .................. 474/69
5,765,847 A * 6/1998 Toronto et al. .............. 280/237
6,676,549 B1 * 1/2004 Fukuda ........................ 474/102
6,695,332 B1 * 2/2004 Kang .......................... 280/237

* cited by examiner

*Primary Examiner*—Bradley T King
*Assistant Examiner*—Nuri Altun
(74) *Attorney, Agent, or Firm*—Ladas & Parry LLP

(57) ABSTRACT

Disclosed herein is a derailleur for a chain bicycle designed to move forward with either forward or reverse rotation of the bicycle's pedals. The chain bicycle comprises a single endless chain, first and second rear wheel sprocket assemblies, first and second one-way clutches to transmit power to a rear wheel hub in only a forward direction, and an idler roller. Any one sprocket of the second rear wheel sprocket assembly engages with the endless chain by using a pantograph linkage, and at the same time, any one sprocket of the first rear wheel sprocket assembly engages with the endless chain by using a chain hook member. The idler roller is coupled to a second base member via a plurality of joint shafts, so as to permit not only rotating, tilting and sliding motions thereof relative to any one joint shaft, but also elastic pivotal rotation in either clockwise or counterclockwise direction relative to another joint shaft parallel to a pedal shaft.

7 Claims, 8 Drawing Sheets

[Fig 1]
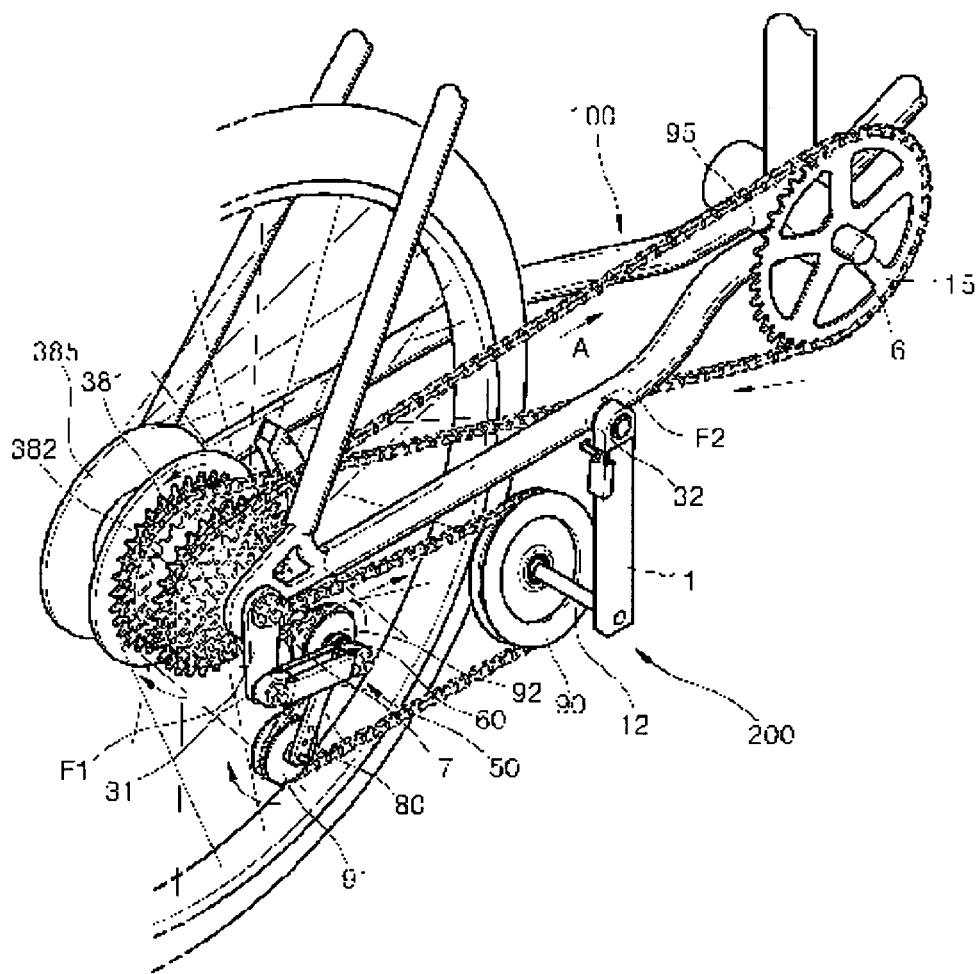

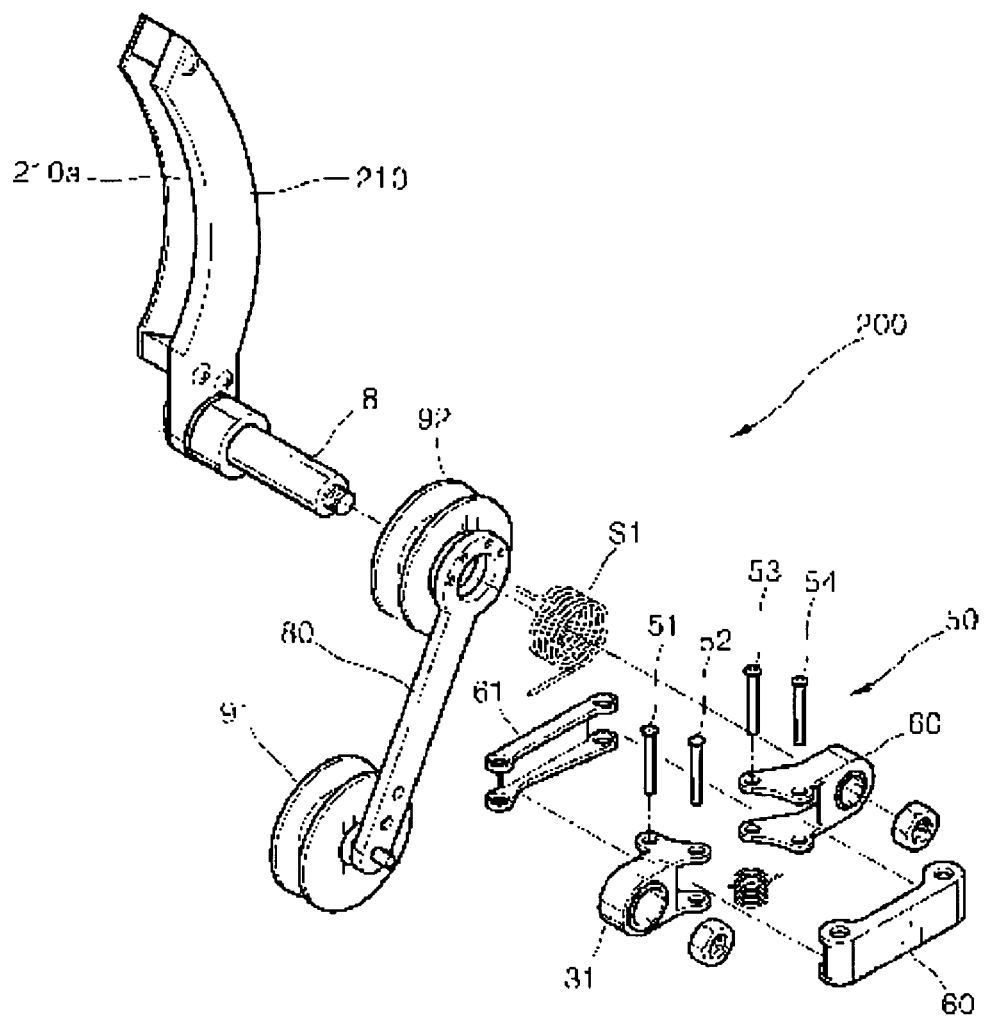
[Fig 2]

[Fig 3a]
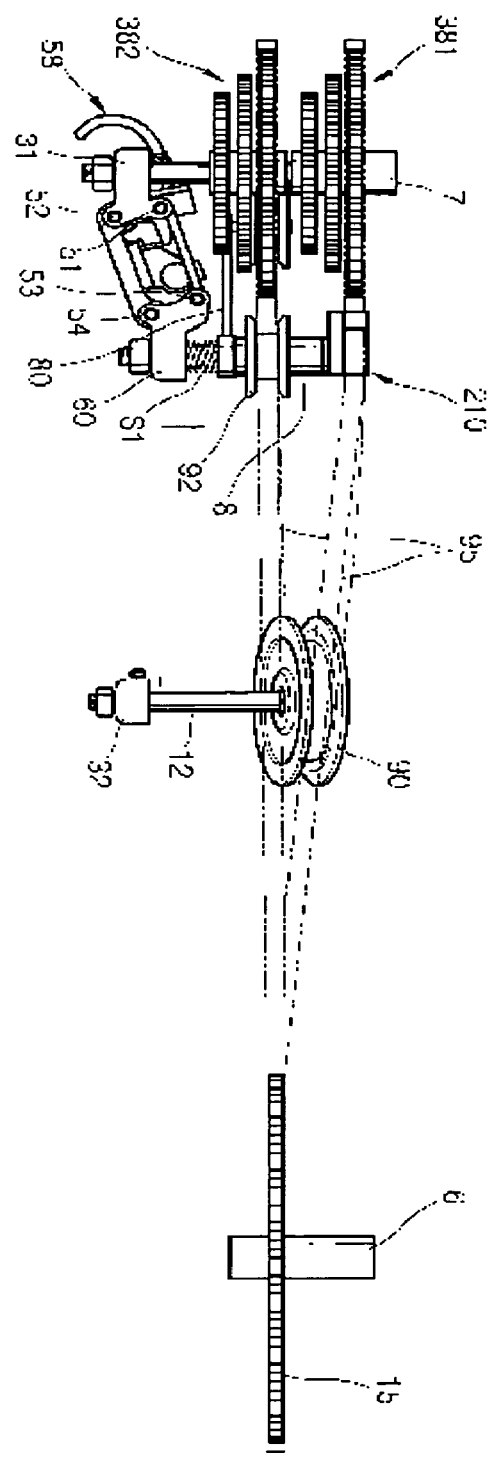

[Fig 3b]
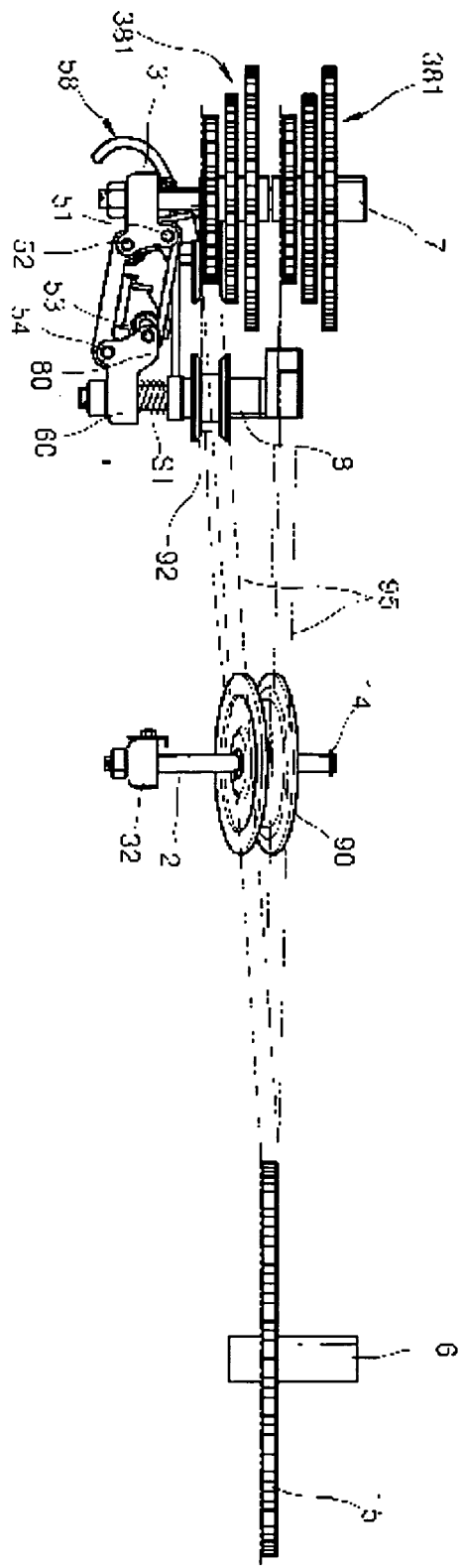

[Fig 4]
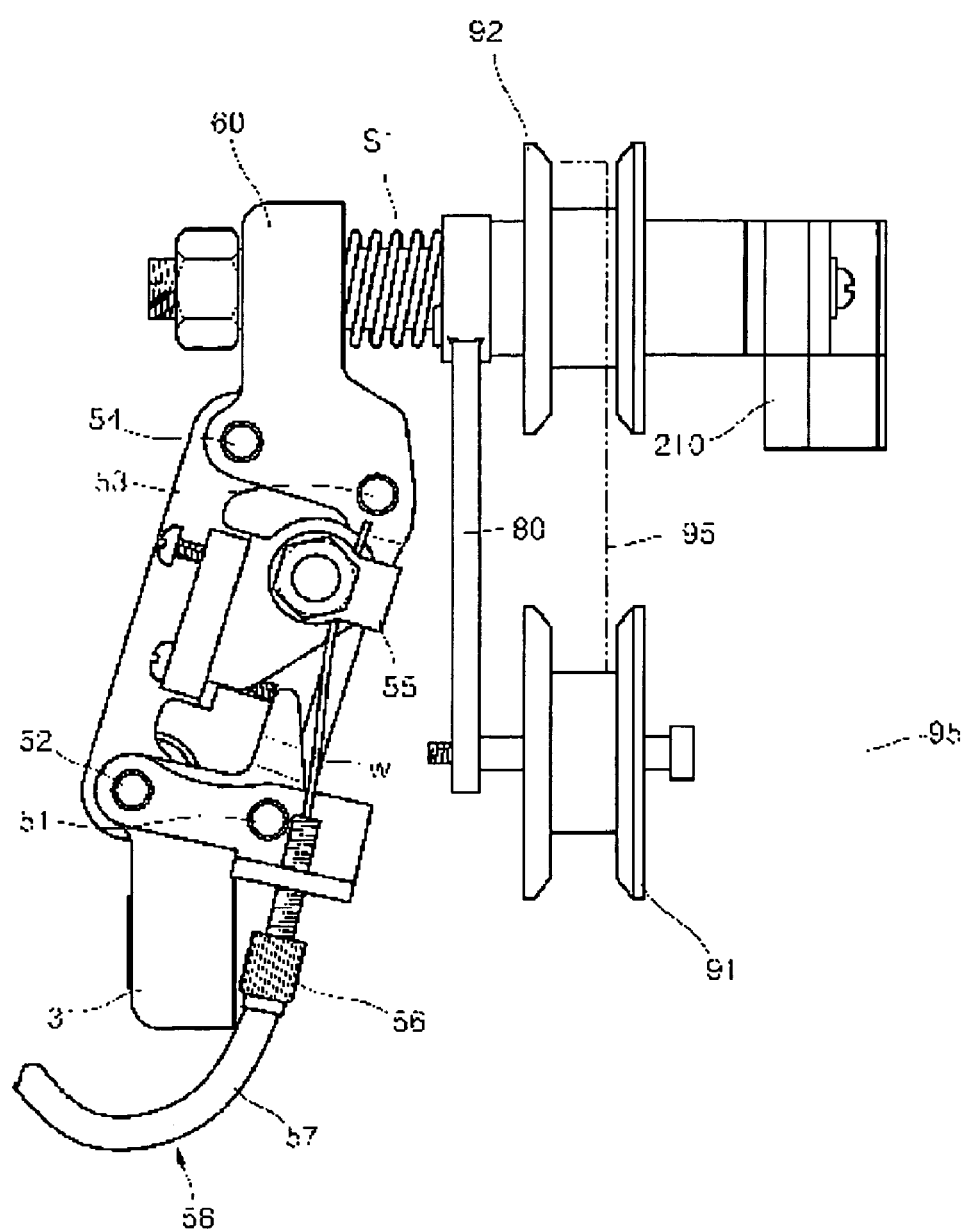

[Fig 5]
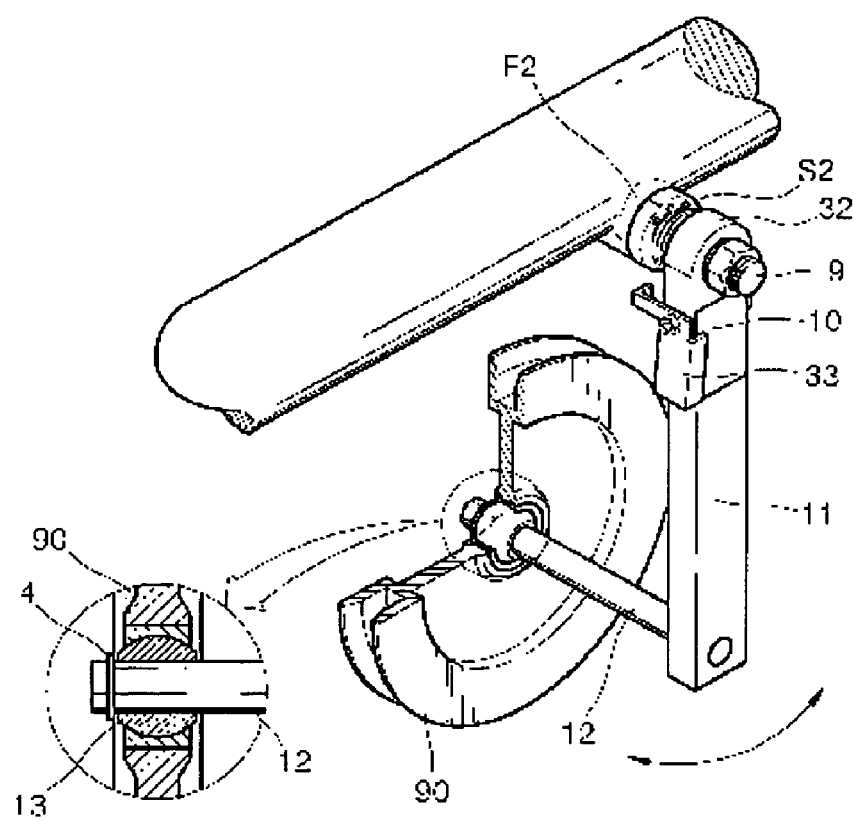

[Fig 6]
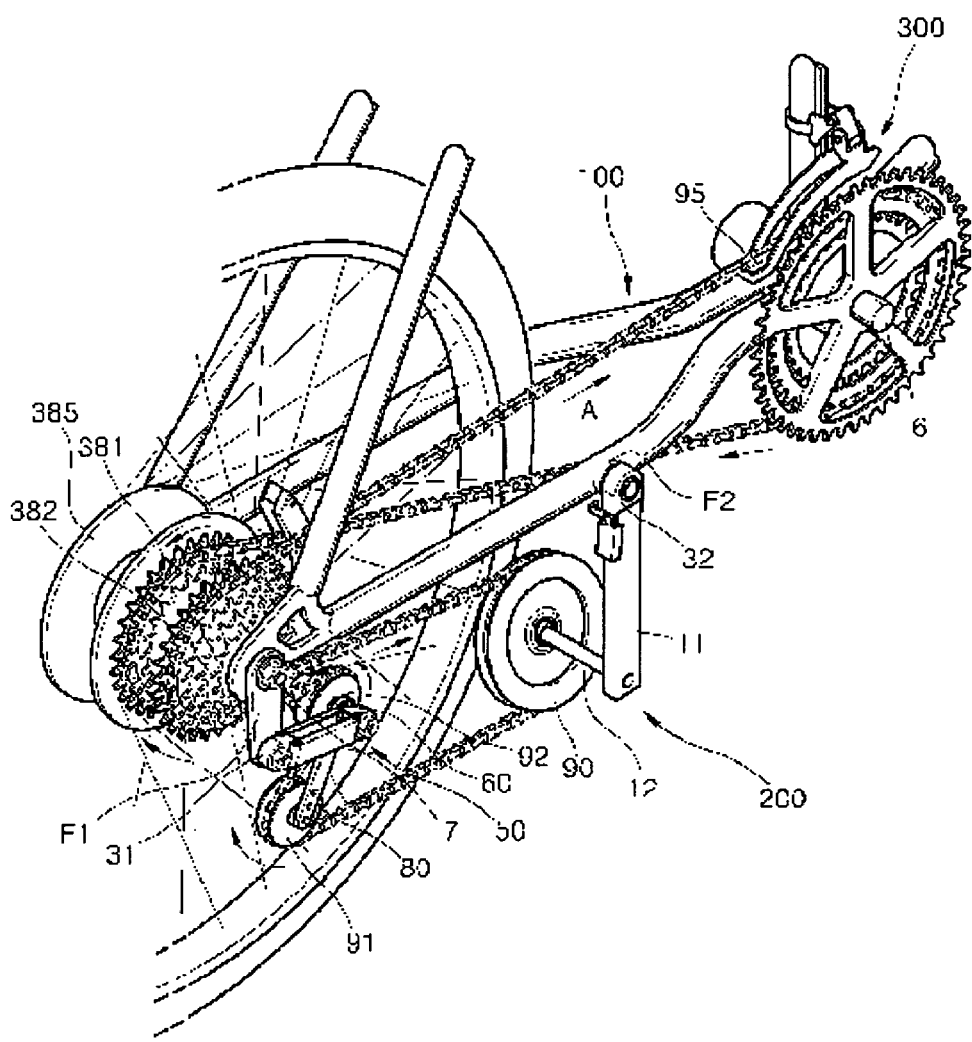

[Fig 7]
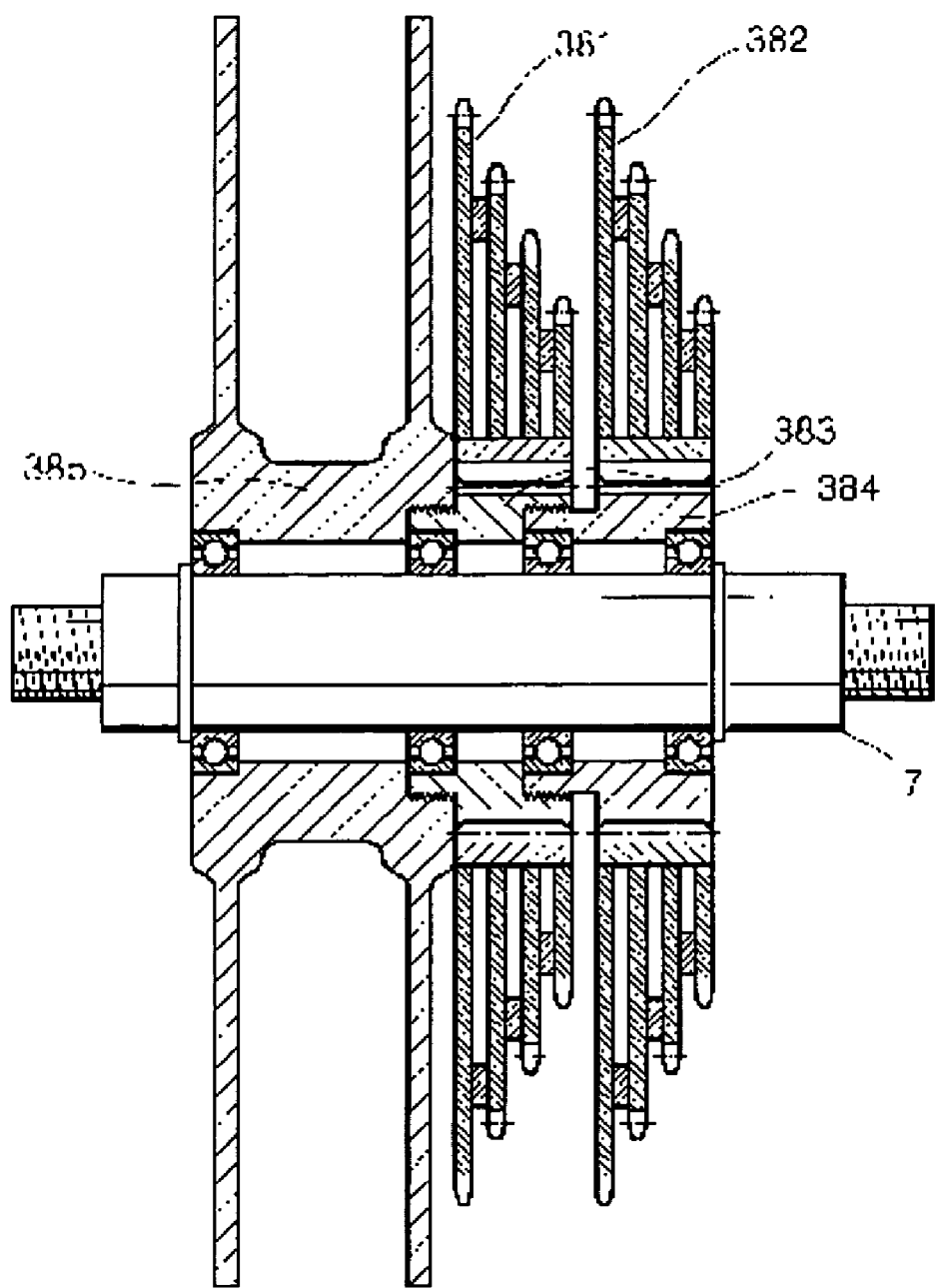

BICYCLE DERAILLEUR

BACKGROUND OF THE INVENTION

1. Field of the Invention

The present invention relates to a bicycle derailleur, and more particularly, to a derailleur for a chain bicycle to permit forward motion of the bicycle by either forward or reverse rotation of the bicycle's pedals.

2. Description of the Related Art

Bicycle riding is excellent exercise. Vigorous biking is wonderful for general body health in that it produces increased heart rate to supply increased blood to the large leg muscles. Further, the constant leg impact associated with jogging is not present.

In the basic bicycle design, a rear wheel of the bicycle is driven by a bicycle chain through a chain sprocket powered by a pedal shaft driven by the legs and feet of the bicyclist operating on a pair of bicycle pedals attached to the pedal shaft.

For the typical bicycle to move in a forward direction, the bicyclist applies force to the pedals causing them to rotate in the same rotational direction as a front wheel of the bicycle for forward motion. This rotational direction is hereinafter referred to as the "forward direction", and an opposite rotational direction is hereinafter referred to as the "reverse direction". Accordingly, the rotational direction of all components of the bicycle will be explained as the forward or reverse direction.

As one kind of currently used typical bicycles, a bicycle which permits a forward force to be applied to a bicycle's drive wheel by either forward or reverse rotation of the bicycle's pedals is known.

An example of the bicycle to permit forward motion of the bicycle with either forward or reverse rotation of the bicycle's pedals is disclosed in UK Patent Laid-open Publication No. 2143599. The disclosed bicycle comprises: two rear wheel sprockets rotatably mounted on a rear wheel shaft via respective one-way clutches along with a rear wheel hub, the clutches being adapted to transmit power in only a forward direction of the bicycle's rear/drive wheel; and an idler sprocket rotatably mounted to a bicycle frame. The bicycle further comprises an endless chain looped around a pedal sprocket as well as both the rear wheel sprockets and the idler sprocket.

In the prior art bicycle configured as stated above, the two rear wheel sprockets drive a rear wheel hub only when they rotate in a forward direction, and rotate separately from the rear wheel hub when they rotate in a reverse direction. Such an arrangement of the two rear wheel sprockets on the rear wheel shaft causes the two rear wheel sprockets to rotate in opposite directions. That is, when one of the rear wheel sprockets rotates in the forward direction, the other sprocket must rotate in the reverse direction.

In addition to permit forward motion of the bicycle by either forward or reverse rotation of the bicycle's pedals, such a configuration as described above permits the bicycle to move forward with a high transmission gear ratio upon forward pedaling and with a low transmission gear ratio upon reverse pedaling.

However, the prior art bicycle, which moves forward by either forward or reverse pedaling, cannot perform transmission with a conventional gear-change means having a known pantograph linkage because the single endless chain surrounds the two rear wheel sprockets. This makes it impossible for the bicyclist to perform transmission upon forward pedaling.

SUMMARY OF THE INVENTION

Therefore, the present invention has been made in view of the above problems, and it is an object of the present invention to provide an improved gear-change mechanism having a pantograph linkage to permit transmission of the bicycle upon forward rotation of the bicycle pedals for use in a chain bicycle in which components of a drive device to permit forward motion of the bicycle by either forward or reverse rotation of bicycle's pedals are arranged on a rear wheel shaft and on a pedal shaft.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic perspective view of a bicycle derailleur and a drive device according to a preferred embodiment of the present invention;

FIG. 2 is an exploded perspective view of a gear-change mechanism shown in FIG. 1;

FIG. 3a is an illustrative view of a forwardly displaced state of a pantograph linkage included in the gear change mechanism shown in FIG. 1;

FIG. 3b is an illustrative view of a backwardly displaced state of the pantograph linkage of the gear change mechanism shown in FIG. 1;

FIG. 4 is an illustrative view of the gear change mechanism shown in FIG. 1, which is in a completely assembled state;

FIG. 5 is a perspective view of an idler roller coupled to a second base member;

FIG. 6 is a perspective view of a plurality of pedal sprockets according to an alternative embodiment of the present invention; and FIG. 7 is a detailed sectional view of a portion B marked in FIG. 1.

DESCRIPTION OF THE PREFERRED EMBODIMENTS

Now, preferred embodiments of the present invention will be explained with reference to the accompanying drawings.

FIG. 1 illustrates a bicycle derailleur and a drive device according to a preferred embodiment of the present invention. As shown in FIG. 1, a chain bicycle according to the present invention comprises a forward drive mechanism 100 to permit forward motion of the bicycle by either forward or reverse rotation of bicycle's pedals. The forward drive mechanism 100 is arranged on the right side of a rear wheel shaft 7 and on a pedal shaft 6.

Similar to conventional chain bicycles, a not shown front wheel and a rear wheel shown in FIG. 1 are fixedly mounted on a front wheel hub (not shown) and a rear wheel hub 385, respectively, and a pedal sprocket 15 is fixedly mounted on the pedal shaft 6.

In the present embodiment, as shown in FIGS. 1, 3a and 3b, the pedal sprocket 15 constitutes the forward drive mechanism 100, and is fixedly mounted on a right end of the pedal shaft 6 so as to rotate with the pedal shaft 6.

The rear wheel hub 385, on which the rear wheel (shown in FIG. 1) is fixedly mounted, is also mounted on the rear wheel shaft 7 via bearings so as to rotate in either forward or reverse direction. Here, the bearings are shown in FIG. 7, but are not designated by reference numerals.

FIG. 7 illustrates a portion B marked in FIG. 1 in more detail. As well shown in FIGS. 1 and 7, first and second rear wheel sprocket assemblies 381 and 382 are arranged on a right end of the rear wheel shaft 7 via known first and second one-way clutches 383 and 384, respectively, which are able to rotate simultaneously while being caught in only a forward direction. Here, each of the first and second rear wheel sprocket assemblies 381 and 382 consists of a plurality of sprockets having different diameters from one another. The known first and second one-way clutches 383 and 384 are mounted on and rotate in either forward or reverse direction with the rear wheel shaft 7 via bearings, which are shown in FIG. 7, but are not designated by reference numerals.

The first one-way clutch 383 comes into fixedly contact at its one end with the rear wheel hub 385 so as to be fixed in a forward direction, and the second one-way clutch 384 comes into fixedly contact with its one end with the other end of the first one-way clutch 383 so as to be fixed in the forward direction.

Referring to FIGS. 1 and 5, a first base member 31 is fixedly mounted to a rear wheel frame F1 located close to the rear wheel, and a second base member 32 is elastically mounted on and pivotally rotates relative to another rear wheel frame F2 located far from the rear wheel. As shown in FIGS. 3a and 3b, a mount member 60 is connected to the first base member 31 via a pantograph linkage 50 in a laterally movable manner, and an idler roller 90 is mounted to the second base member 32 in a rotatable, and laterally and obliquely slidable manner.

As shown in FIGS. 1 to 4, the mount member 60 is fastened on a shaft 8 extending in a direction parallel to the rear wheel shaft 7, on which a guide pulley 92 is rotatably mounted. Further, a rocker arm 80 is rotatably mounted at its one end on the shaft 8. The other end of the rocker arm 80 is provided with a tension pulley 91 in a rotatable manner. A return spring S1 is coiled around the shaft 8 so that one end thereof is fixed to the mount member 60 and the other end thereof is fixed on the end of the rocker arm 80.

As shown in FIG. 1, an endless chain 95 is looped around the pedal sprocket 15, the first and second rear wheel sprocket assemblies 381 and 382, the idler roller 90, the tension pulley 91 and the guide pulley 92.

With such a configuration as described above, when the pedal shaft 6 rotates in a forward direction by forward rotation of the bicycle's pedals, the endless chain 95 transmits power in an order of the top of the pedal sprocket 15, the bottom of the pedal sprocket 15, the top of the first rear wheel sprocket assembly 381, the bottom of the sprocket assembly 381, the top of the idler roller 90, the bottom of the roller 90, the bottom of the tension pulley 91, the top of the pulley 91, the bottom of the guide pulley 92, the top of the guide pulley 92, the bottom of the second rear wheel sprocket assembly 382, the top of the sprocket assembly 382, and the top of the pedal sprocket 15 as an original starting point.

On the other hand, when the pedal shaft 6 rotates in a reverse direction by reverse rotation of the bicycle's pedals, the endless chain 95 transmits power in an order of the top of the pedal sprocket 15, the top of the second rear wheel sprocket assembly 382, the bottom of the sprocket assembly 382, the top of the guide pulley 92, the bottom of the pulley 92, the top of the tension pulley 91, the bottom of the pulley 91, the bottom of the idler roller 90, the top of the roller 90, the bottom of the first rear wheel sprocket assembly 381, the top of the sprocket assembly 381, the bottom of the pedal sprocket 15, and the top of the pedal sprocket 15 as an original starting point.

When the second rear wheel sprocket assembly 382 rotates in the forward direction, the first rear wheel sprocket assembly 381 rotates in the reverse direction. This causes the second rear wheel sprocket assembly 382 to forwardly drive the rear wheel hub 385, on which the rear wheel is fixedly mounted, via the second one-way clutch 384 and successively the first one-way clutch 383. In this case, the first rear wheel sprocket assembly 381 rotates freely on the first one-way clutch 383.

With reverse rotation of the bicycle's pedals, the first rear wheel sprocket assembly 381 drives forwardly the rear wheel hub 385, on which the rear wheel is fixedly mounted, via the first one-way clutch 383. In this case, the second rear wheel sprocket assembly 382 rotates freely in the reverse direction on the second one-way clutch 384.

The forward drive mechanism 100 configured as stated above is able to perform transmission by means of a gear-change mechanism 200 coupled with the pantograph linkage 50. Now, the gear-change mechanism 200 will be explained.

Referring to FIG. 2, the pantograph linkage 50 includes two links 61 and four pivot pins 51, 52, 53 and 54 to interlink the first base member 31 with the mount member 60. By means of a wire W connected to one of the links 61 via a connector 55 as well as a control cable 58 wrapped by a sheath 57 and mounted on the first base member 31 via an adjustment barrel 56, the pantograph linkage 50 moves the shaft 8 fixed to the mount member 60 in a lateral direction parallel to the direction of an axis of the rear wheel shaft 7. As the shaft 8 moves laterally according to the extension or retraction of the wire W, the guide pulley 92 moves in the same lateral direction as the shaft 8, thereby causing the endless chain 95, extending between the guide pulley 92 and the second rear wheel sprocket assembly 382, to be selectively looped around any one of the sprockets of the second rear wheel sprocket assembly 382.

In the present embodiment, a chain hook member 210 is fixedly mounted on the shaft 8, in order to permit respective sprockets of the first rear wheel sprocket assembly 381 to produce the same transmission gear ratio as the respective sprockets of the second rear wheel sprocket assembly 382 when the sprockets of the assembly 382 produce effective different transmission gear ratios according to the lateral movement of the guide pulley 92.

The chain hook member 210 is detachably mounted at its one end on the shaft 8, and the other end of the chain hook member 210 has a generally crescent shape and extends upward while defining a chain penetration slot 210a sized to permit a height difference between the respective sprockets of the first rear wheel sprocket assembly 381.

Viewing from the direction of an axis of the shaft 8, a distance between the guide pulley 92 and the chain penetration slot 201a of the chain hook member 210 is the same as a distance between selected two corresponding sprockets of the first and second rear wheel sprocket assemblies 381 and 382 having the same diameter as each other.

The chain hook member 210, configured as stated above, serves to catch part of the endless chain 95, extending between the first rear wheel sprocket assembly 381 and the pedal sprocket 15, by passing the endless chain 95 therethrough, thereby allowing the endless chain 95 to engage with any one sprocket of the first rear wheel sprocket assembly 381 in cooperation with the lateral movement of the shaft 8.

In the present embodiment, a chain length between the tension pulley 91 and the idler roller 90 measured where the endless chain 95 is engaged around the largest two sprockets of the first and second rear wheel sprocket assemblies 381 and 382 is very different from a chain length between the tension pulley 91 and the idler roller 90 measured where the endless chain 95 is engaged around the smallest two sprockets of the first and second rear wheel sprocket assemblies 381 and 382.

Such a chain length difference causes the endless chain 95, which extends between the first rear wheel sprocket assembly 381 and the idler roller 90, to show an excessive inclination variation in all directions. In consideration of this problem, the idler roller 90 of the present embodiment is configured to accommodate such a chain length difference and chain inclination variation, as will be described below.

The idler roller 90, as described above, is mounted to the second base member 32 which is in turn mounted on and rotates relative to the frame F2.

A fixing shaft 9 is fixed at its one end to the frame F2, and the other end of the fixing shaft 9 protrudes outward in a direction parallel to the rear wheel shaft 7 or pedal shaft 6. On the other outwardly protruding end of the fixing shaft 6 is rotatably mounted the second base member 32. A return spring S2 is coiled around the fixing shaft 9 so that one end thereof is fixed on the fixing shaft 9 and the other end thereof is fixed to the second base member 32.

A hinge shaft 10 is fixedly supported at its both ends by a lower end of the second base member 32. The hinge shaft 10 extends in a direction perpendicular to the rear wheel shaft 7 or pedal shaft 6 but parallel to a direction of forward motion of the bicycle. A bar 11 is suspended from the hinge shaft 10 as one end thereof is rotatably mounted on the hinge shaft 10. The other end of the bar 11 extends in a direction perpendicular to the rear wheel shaft 7 or pedal shaft 6 and also perpendicular to the direction of forward motion of the bicycle.

A guide shaft 12 is fixedly inserted at its one end in the other end of the bar 11 and is adapted to guide lateral movement of the idler roller 90. The other end of the guide shaft 12 extends in a direction parallel to the fixing shaft 9 and opposite to an extending direction of the fixing shaft 9.

In order to permit rotating and tilting motion of the idler roller 90 relative to the guide shaft 12, the other end of the guide shaft 12 is fitted in a ball-socket joint 13 in a sliding movable and rotatable manner. The ball-socket joint 13 is in turn fitted in the center of the idler roller 90, thereby allowing rotating and tilting motion of the idler roller 90.

A separation-preventing piece 14 is detachably mounted around the other end of the guide shaft 12 in order to prevent the ball-socket joint 13 from being separated from the guide shaft 12.

With such a configuration as stated above, the idler roller 90 is not only elastically rotatable relative to the fixing shaft 9, but also rotatable and tiltable relative to the guide shaft 12 while being capable of moving along the guide shaft 12. Therefore, the idler roller 90 is able to accommodate the above mentioned chain length difference and chain inclination variation.

In the present embodiment, since the idler roller 90 is linked to the second base member 32 via several joint members, there is a risk of damage to the idler roller 90 and the associated several joint members when the bicycle is dropped on its side. Therefore, in order to eliminate such a damage risk, preferably, a limiter 33 is provided at a side wall of the second base member 32 while being fixedly mounted at its one end on the end of the hinge shaft 10, so as to limit a pivotal rotation range of the bar 11 relative to the hinge shaft 10. That is, the bar 11 is able to freely rotate forward from its vertical erected state, but is limited in its backward rotation by only a limited angle.

Meanwhile, in order to widen an allowable transmission gear ratio range of the bicycle, as shown in FIG. 6, the pedal sprocket 15, which is fixedly mounted on the pedal shaft 6, may be preferably substituted by a pedal sprocket assembly consisting of a plurality of pedal sprockets having different diameters, similar to the first and second rear wheel sprocket assemblies 381 and 382 of the present embodiment. In this case, an additional known chain hook member 300, which is able to pivotally rotate through adjustment of the control cable, must be provided in order to permit the endless chain to selectively engage with any one pedal sprocket of the pedal sprocket assembly. Such a chain hook member, for example, may be a chain hook member disclosed in Japanese Patent Laid-open Publication No. Heisei 07-47987.

As apparent from the above description, the present invention provides an improved bicycle derailleur which can effectively perform transmission of a conventional chain bicycle which is designed to move forward by either forward or reverse rotation of the bicycle's pedals. Conventionally, since a single endless chain is looped around two rear wheel sprockets, the chain bicycle cannot perform transmission using a known pantograph linkage when the bicycle's pedals rotate forward. However, by virtue of the use of an improved pantograph linkage as well as an idler roller capable of accommodating chain length difference and chain inclination variation caused upon transmission, the present invention enables transmission of such a conventional chain bicycle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A derailleur of a chain bicycle comprising: two rear wheel sprocket assemblies rotatably mounted on a rear wheel shaft via first and second one-way clutches along with a rear wheel hub, the one-way clutches being adapted to transmit power in only a forward direction of a bicycle's rear/drive wheel; an idler roller rotatably mounted to a bicycle frame; and an endless chain looped around a pedal sprocket as well as both the two rear wheel sprocket assemblies and the idler roller, each of the two rear wheel sprocket assemblies serving to drive a rear wheel hub only when the hub rotates in a forward direction and to rotate separately from the rear wheel hub when the hub rotates in a reverse direction, one of the two rear wheel sprocket assemblies rotating in the forward or reverse direction when the other one of the two rear wheel sprocket assemblies rotating in the reverse or forward direction, wherein a first base member is fixedly mounted to a first rear wheel frame located close to the rear wheel to permit a mount member to be connected thereto in a laterally movable manner via a pantograph linkage, and a second base member is elastically mounted on and pivotally rotates relative to a second rear wheel frame located far from the rear wheel to permit an idler roller to be mounted thereto in a rotatable manner, wherein the mount member is fastened on a joint shaft extending in a direction parallel to the rear wheel shaft, and on the joint shaft are rotatably mounted a guide pulley and a first end of a rocker arm, a second end of the rocker arm being provided with a tension pulley in a rotatable manner, a first return spring being coiled around the joint shaft so that one end thereof is fixed to the mount member and the other end thereof is fixed on the first end of the rocker arm, wherein the endless chain is looped around the pedal sprocket, the first and second rear wheel sprocket assemblies, the idler roller, the tension pulley and the guide pulley, so that, when a pedal shaft rotates in the forward direction by forward rotation of the bicycle's pedals, the endless chain transmits power in an order of the top of the pedal sprocket, the bottom of the pedal sprocket, the top of the first rear wheel sprocket assembly, the bottom of the first rear wheel sprocket assembly, the top of the idler roller, the bottom of the idler roller, the bottom of the tension pulley, the top of the tension pulley, the bottom of the guide pulley, the top of the guide pulley, the bottom of the second rear wheel sprocket assembly, the top of the second rear wheel sprocket assembly, and the top of the pedal sprocket as an original starting point, wherein a chain hook member is fixedly mounted on the joint shaft, in order to permit respective sprockets of the first rear wheel sprocket assembly to produce the same transmission gear ratio as respective sprockets of the second rear wheel sprocket assembly producing effective different transmission gear ratios, according to lateral movement of the guide pulley, wherein the idler roller is connected to the second base member via plural joint shafts to permit not only rotating, tilting and sliding motions thereof relative to any one joint shaft, but also elastic pivotal rotation in either clockwise or counterclockwise direction relative to another joint shaft parallel to the pedal shaft.

2. The derailleur as set forth in claim 1, wherein the chain hook member is detachably mounted at a first end thereof on the joint shaft and the other end of the chain hook member has a generally crescent shape and extends upward while defining a chain penetration slot sized to permit a height difference between the respective sprockets of the first rear wheel sprocket assembly, wherein the chain penetration slot of the chain hook member serves to catch the endless chain, extending between the first rear wheel sprocket assembly and the pedal sprocket, by passing the endless chain therethrough, thereby allowing the endless chain to engage with any one sprocket of the first rear wheel sprocket assembly according to the lateral movement of the joint shaft, and wherein, viewing from the direction of an axis of the joint shaft, a distance between the guide pulley and the chain penetration slot of the chain hook member is the same as a distance between selected two corresponding sprockets of the first and second rear wheel sprocket assemblies, the corresponding sprockets having the same diameter as each other.

3. The derailleur as set forth in claim 1 or 2, wherein a fixing shaft is fixed at a first end thereof to the second rear wheel frame and a second end of the fixing shaft protrudes outward in a direction parallel to the rear wheel shaft or pedal shaft so as to permit the second base member to be rotatably mounted thereon, a second return spring being coiled around the fixing shaft so that one end thereof is fixed on the fixing shaft and the other end thereof is fixed to the second base member, wherein a bar is coupled at a first end thereof to a first end of the second base member so that a second end thereof is suspended in a direction perpendicular to the rear wheel shaft or pedal shaft and also perpendicular to a direction of forward motion of the bicycle, wherein a guide shaft is fixedly inserted at a first end thereof in the second end of the bar to guide lateral movement of the idler roller, and a second end of the guide shaft extends in a direction parallel to the fixing shaft and opposite to an extending direction of the fixing shaft, wherein a ball-socket joint is movably and rotatably mounted on the guide shaft and the idler roller is rotatably and tiltably mounted on the ball-socket joint, in order to permit rotating and tilting motion of the idler roller relative to the guide shaft.

4. The derailleur as set forth in claim 3, wherein a separation-preventing piece is detachably mounted around the second end of the guide shaft in order to prevent the ball-socket joint from being separated from the guide shaft.

5. The derailleur as set forth in claim 3, wherein a hinge shaft is fixedly supported at its both ends by the first end of the second base member to extend in a direction perpendicular to the rear wheel shaft or pedal shaft but parallel to the direction of forward motion of the bicycle, wherein the first end of the bar is rotatably mounted on the hinge shaft, and wherein a limiter is provided at a side wall of the second base member while being fixedly mounted at its one end on the end of the hinge shaft so as to limit a pivotal rotation range of the bar relative to the hinge shaft, thereby allowing the bar to freely rotate forward from its vertical erected state, but is limited in its backward rotation by only a limited angle.

6. The derailleur as set forth in claim 1 or 2, wherein the pedal sprocket is fixedly mounted on the pedal shaft and takes in the form of an assembly of a plurality of pedal sprockets having different diameters, and an additional chain hook member, capable of pivotally rotating through adjustment of a control cable, is provided.

7. The derailleur as set forth in claim 1, wherein the rear wheel hub is mounted on and rotates in either forward or reverse direction with the rear wheel shaft via bearings, and wherein the first and second rear wheel assemblies are mounted on a right end of the rear wheel shaft via the respective one-way clutches rotating simultaneously while being caught in only the forward direction, wherein the one-way clutches are mounted on the rear wheel shaft via the bearings so as to freely rotate in either the forward or reverse direction, and wherein the first one-way clutch comes into fixedly contact at its one end with the rear wheel hub so as to be fixed in a forward direction, and the second one-way clutch comes into fixedly contact with its one end with the other end of the first one-way clutch so as to be fixed in the forward direction.

* * * * *